Dec. 15, 1925.
F. J. LEGGOTT
LATHE TOOL
Filed July 5, 1923
1,565,656
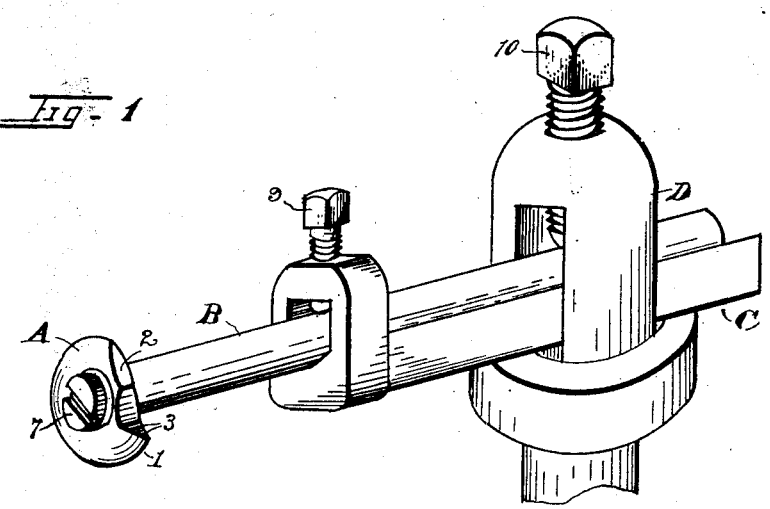
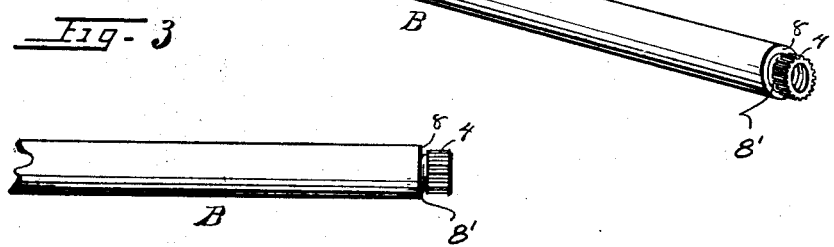
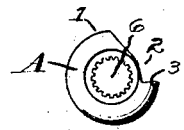
WITNESSES
L. E. Randall
B. Gwathin
INVENTOR
Fred J. Leggott
By Victor E. Randall
Atty.

Patented Dec. 15, 1925.

1,565,656

UNITED STATES PATENT OFFICE.

FRED J. LEGGOTT, OF BATTLE CREEK, MICHIGAN.

LATHE TOOL.

Application filed July 5, 1923. Serial No. 649,597.

*To all whom it may concern:*

Be it known that I, FRED J. LEGGOTT, a citizen of the United States, residing at Battle Creek, in the county of Calhoun and State of Michigan, have invented certain new and useful Improvements in Lathe Tools, of which the following description with appended claims, taken in connection with the accompanying drawing, forms a specification.

The present invention more particularly relates to circular detachable thread-cutting devices, and more especially to tools of the character for cutting threads on interior surfaces.

An important feature of the invention lies in exteriorly fluting the end of the cutter-holding bar and forming a correspondingly fluted surface on the wall of the hole in the cutter head so that the latter may be minutely adjusted on its seat and rigidly held from twisting.

One object of the invention is to facilitate the placing and removal of the cutter head as occasion may require in setting or sharpening the tool. Another object of the invention is to so form the cutter-head that it may be used for either interior or exterior lathe work without removing the tool-holding bar from its post. A still further object of the invention is to so form the cutter-head that in grinding for sharpening the tool the work may be readily accomplished by an ordinary artisan without distorting or misshaping the pitch of the cutting edge, this being absolutely essential where perfect fitting of screw-threaded surfaces is required.

The present invention has in view the construction of a tool for cutting screw-threads upon interior surfaces so that the threads may be more readily formed and more perfectly shaped than could be done with forged or other tools necessitating reshaping the cutting edges in grinding back to effect a cutting surface.

In carrying out my invention the accompanying drawings show a preferred embodiment thereof, in which—

Figure 1 is a perspective view showing the tool as used for interior screw-threading purposes and held in position by a tool bar and its post.

Fig. 2 is a perspective view of the tool-holding bar.

Fig. 3 is a broken side elevation of the tool-holding bar.

Fig. 4 is a side view of the circular-shaped thread-cutting tool.

Like marks of reference refer to corresponding or equivalent parts in the different views, in which A represents my improved cutting tool; B, the tool-holding shank; C, a bar support; and D, a tool post; the bar support and tool post being of a type generally used for lathe purposes.

The tool A is formed from any suitable steel and before being made into the requisite form shown in the drawings might be a flattened disc such as would be formed in cutting a round bar into very short sections. For thread-cutting purposes a round steel bar is turned or ground, or both turned and ground, diagonally from a central circumferential line 1, form a V-shaped cutting edge meeting on either side of the flattened surfaces of a disc cut from said bar. A disc of the kind is then ground or cut away from a portion of the circumference, as at 2, so that a short chord line is formed from near its center to the circumference, the line of which forms on either side the cutting edges 3 of the tool, the opposite side of the cut-away portion forming a slightly receding line so that sufficient clearance will be formed for the cutting edges. The tool is fastened over a reduced longitudinally fluted end 4 of the shank B, and it is held from twisting on its seat by having the wall of its central aperture 6 fluted to register with the fluting on said shank, and that the parts may be securely fastened together, a flat or fillister-headed screw 7 is screw-threaded into a central screw-threaded hole in the shank, as shown in Fig. 1. As shown in Figs. 2 and 3, the shank B is formed with a shoulder 8 against which the cutting head or tool abuts between the shoulder 8 and the inner end of the fluting on the end of the shank 4, a small groove 8' is formed to permit the tool A to be perfectly seated against said shoulder, which otherwise would not in every circumstance, owing to infinitesimal or small particles of foreign matter lodging between said shoulder and the tool, or from unremoved stock in machining the tool holding bar preventing the tool from snugly seating against said shoulder at the juncture where the fluted shank otherwise would meet with said shoulder, in the absence of the groove.

In fluting the aperture 6, in the tool A, a broaching tool is used corresponding to the ribs formed on the shank 4. The wall of the aperture thus made insures perfect fitting of the tool upon its receiving shank and provides for releasing and re-adjusting the tool at various degrees of pitch, without disturbing a longitudinal adjustment of the shank B in rolling it to accommodate the pitch of said tool.

The shank B is held in a longitudinal V-shaped groove of the bar C by a set-screw 9, and the bar C in turn is held to a lathe carriage by means of a set screw 10 of the toolpost D in the usual manner.

I claim:

In a tool of the class set forth, the combination with a disc-shaped cutter having a peripheral notch and formed with a round central hole having a longitudinally fluted wall, a round supporting bar having a reduced concentric longitudinally fluted shank, said shank being complemental with and adapted to receive said cutter, said bar having a clearance space between the inner ends of the ribs on its fluted shank and a shoulder of said bar against which said cutter is adapted to operatively abut from either side, and means to secure said cutter on said bar, substantially as and for the purpose set forth.

FRED J. LEGGOTT.